United States Patent [19]

Kusuda

[11] Patent Number: 5,396,611
[45] Date of Patent: Mar. 7, 1995

[54] MICROPROCESSOR USE IN IN-CIRCUIT EMULATOR HAVING FUNCTION OF DISCRIMINATING USER'S SPACE AND IN-CIRCUIT EMULATOR SPACE

[75] Inventor: Masahiro Kusuda, Tokyo, Japan

[73] Assignee: NEC Corporation, Tokyo, Japan

[21] Appl. No.: 251,020

[22] Filed: May 31, 1994

Related U.S. Application Data

[63] Continuation of Ser. No. 703,108, May 17, 1991, abandoned.

[30] Foreign Application Priority Data

May 17, 1990 [JP] Japan .................................. 2-128046

[51] Int. Cl.6 ............................................. G06F 13/42
[52] U.S. Cl. ................................ 395/550; 364/927.81; 364/948.1; 364/950; 364/271.6
[58] Field of Search ............... 395/200, 800, 775, 550, 395/500, 375

[56] References Cited

U.S. PATENT DOCUMENTS 4,580,213  4/1986  Hulett ........................... 364/DIG. 1
4,860,246  8/1989  Inoue ............................ 364/DIG. 2

Primary Examiner—David Y. Eng
Attorney, Agent, or Firm—Whitham, Curtis, Whitham & McGinn

[57] ABSTRACT

A microprocessor having three kinds of bus cycle mode including a read cycle, a write cycle and an instruction fetch cycle, comprises a register having three bits corresponding to the read cycle, the write cycle and the instruction fetch cycle, respectively. A combinational circuit is connected to receive a code set in the register and coded information indicating the kind of bus cycle mode. An output circuit receiving an output of the combinational circuit operates to output the output of the combinational circuit in synchronism with a start of a corresponding bus cycle.

8 Claims, 8 Drawing Sheets

FIGURE 4

| $ST_2$ | $ST_1$ | $ST_0$ | $R/\overline{W}$ | KIND OF BUS CYCLE |
|---|---|---|---|---|
| 0 | 0 | 0 | 0 | MEMORY DATA WRITE |
| 0 | 0 | 0 | 1 | MEMORY DATA READ |
| 0 | 0 | 1 | 0 | NO GENERATION |
| 0 | 0 | 1 | 1 | SYSTEM BASE TABLE READ |
| 0 | 1 | 0 | 0 | ADDRESS TRANSLATION TABLE WRITE |
| 0 | 1 | 0 | 1 | ADDRESS TRANSLATION TABLE READ |
| 0 | 1 | 1 | 0 | NO GENERATION |
| 0 | 1 | 1 | 1 | INSTRUCTION FETCH |
| 1 | 0 | 0 | 0 | COPROCESSOR DATA WRITE |
| 1 | 0 | 0 | 1 | COPROCESSOR DATA READ |
| 1 | 0 | 1 | 0 | I/O DATA WRITE |
| 1 | 0 | 1 | 1 | I/O DATA READ |
| 1 | 1 | 0 | 0 | NO GENERATION |
| 1 | 1 | 0 | 1 | HALT ACKNOWLEDGE |
| 1 | 1 | 1 | 0 | ACKNOWLEDGE OF TRANSITION TO ICE MODE |
| 1 | 1 | 1 | 1 | INTERRUPT ACKNOWLEDGE |

MICROPROCESSOR USE IN IN-CIRCUIT EMULATOR HAVING FUNCTION OF DISCRIMINATING USER'S SPACE AND IN-CIRCUIT EMULATOR SPACE

CROSS-REFERENCE TO RELATED APPLICATION

This application is a continuation of application Ser. No. 07/703,108, filed May 17, 1991, now abandoned.

BACKGROUND OF THE INVENTION

1. Field of the Invention

The present invention relates to a microprocessor for use in an in-circuit emulator, and more specifically to a circuit, incorporated in such a microprocessor, for discriminating a user address space and an in-circuit emulator address space. In this specification, the in-circuit emulator will be often abbreviated to "ICE".

2. Description of Related Art

In the prior art, small-sized microprocessors for use in an in-circuit emulator have been used in such a manner that an address space of the smaller address sized microprocessor is divided into a plurality of small spaces, and an internal memory corresponding to the smaller address spaces are previously set with desired values, so that at each time anyone of the smaller address spaces is accessed, a corresponding one of the previously set desired values can be obtained at an external terminal. In addition, a status bit for distinguishing between a user address space and an ICE space (in-circuit emulator address space) is previously set in the internal memory, and an integrated circuit for the small-sized microprocessor discriminates between the user space and the ICE address space for each of the smaller address spaces as mentioned above.

On the other hand, middle-sized or large-sized microprocessors have neither an internal memory corresponding to the smaller address spaces in the small-sized microprocessors, nor an external terminal for outputting information about the smaller address spaces. Alternatively, equivalent functions or means have been realized by circuits external to the middle/large-sized microprocessors.

In addition to the equivalent means realized in the middle/large-sized microprocessors, an address space discriminating means for discriminating between the user address space and the ICE address space has been required. This address space discriminating means is realized by pairing two consecutive bus cycles in an ICE mode in which an ICE monitor program normally runs, and by using a first bus cycle of the bus cycle pair for discriminating whether a second bus cycle (a bus cycle immediately after the first bus cycle) for read/write access to an I/O (input/output) device or memory external to the microprocessor is an access to the user address space. If a second bus cycle is the user address space access, the space discriminating means triggers an ICE address space access bus cycle indicating that one immediate-after bus cycle for read/write access to the I/O device or memory external to the microprocessor is the access to the user address space. In addition, the space discriminating means includes a circuit, external to the microprocessor, for changing the access of the above mentioned immediate-after bus cycle instructed in the ICE monitor program to the user address space access.

In the above mentioned small-sized microprocessor, however, a part of a full address space is mapped to an ICE address space in the ICE mode. Therefore, if the part of the address space mapped to the ICE address space is overlapped with an address of the user address space desired to be accessed in the ICE mode, it is necessary to re-map the ICE address space, and therefore, the ICE monitor program inevitably becomes complicated. In addition, performance of the ICE function is lowered by intervention of a processing for detecting address overlapping.

In the middle/large-sized microprocessors, the processing for detecting address overlapping has been also required, and in addition, even if the external circuit is used, it becomes high in cost to divide a full address space of the middle/large-sized microprocessors into smaller address spaces and to discriminate a desired number of smaller address spaces.

Furthermore, the external circuit increases a delay time of various control signals inputted to and outputted from an ICE probe for the middle/large-sized microprocessors, with the result that a user hardware sustains restrictions, and the ICE often becomes unusable.

In this connection, if there is provided the means for indicating in the ICE mode that the immediately succeeding ICE address space access is the user address space access, it has become unnecessary to re-map the ICE address space. However, a substantial time has been required for access to the user address space, and in addition, an external hardware has been needed, similarly to the above case. Therefore, various control signals inputted to and outputted from an ICE probe for the middle/large-sized microprocessors, have an increased delay time.

SUMMARY OF THE INVENTION

Accordingly, it is an object of the present invention to provide a microprocessor for use in an in-circuit emulator, which has overcome the above mentioned defect of the conventional one.

Another object of the present invention is to provide a microprocessor for use in an in-circuit emulator, which does not require the re-mapping processing in the ICE monitor program, and which can avoid the increase of the delay in various control signals.

The above and other objects of the present invention are achieved in accordance with the present invention by a microprocessor having three kinds of bus cycle mode including a read cycle, a write cycle and an instruction fetch cycle, the microprocessor comprising a register having three bits corresponding to the read cycle, the write cycle and the instruction fetch cycle, respectively, a combinational circuit connected to receive a code set in the register and coded information indicating the kind of bus cycle mode, and an output circuit receiving an output of the combinational circuit so as to output the output of the combinational circuit in synchronism with a start of a corresponding bus cycle.

As mentioned above, the conventional microprocessors have been such that the address space discriminating means is realized by mapping a part of the address address space to an ICE space by means of internal/external hardware, or by pairing two consecutive bus cycles and using a first bus cycle of the bus cycle pair for the space discrimination and a second bus cycle for access to the user address space. On the other hand, the present invention is characterized in that the space discrimination is conducted on the basis of the previously set condition in accordance with the bus cycle attribute of the read cycle, the write cycle and the instruction fetch cycle.

The above and other objects, features and advantages of the present invention will be apparent from the following description of preferred embodiments of the invention with reference to the accompanying drawings.

BRIEF DESCRIPTION OF THE DRAWINGS

FIG. 4 is a table showing status codes illustrating examples of an operation of the combinational circuit;

DESCRIPTION OF THE PREFERRED EMBODIMENTS

Figure 1:
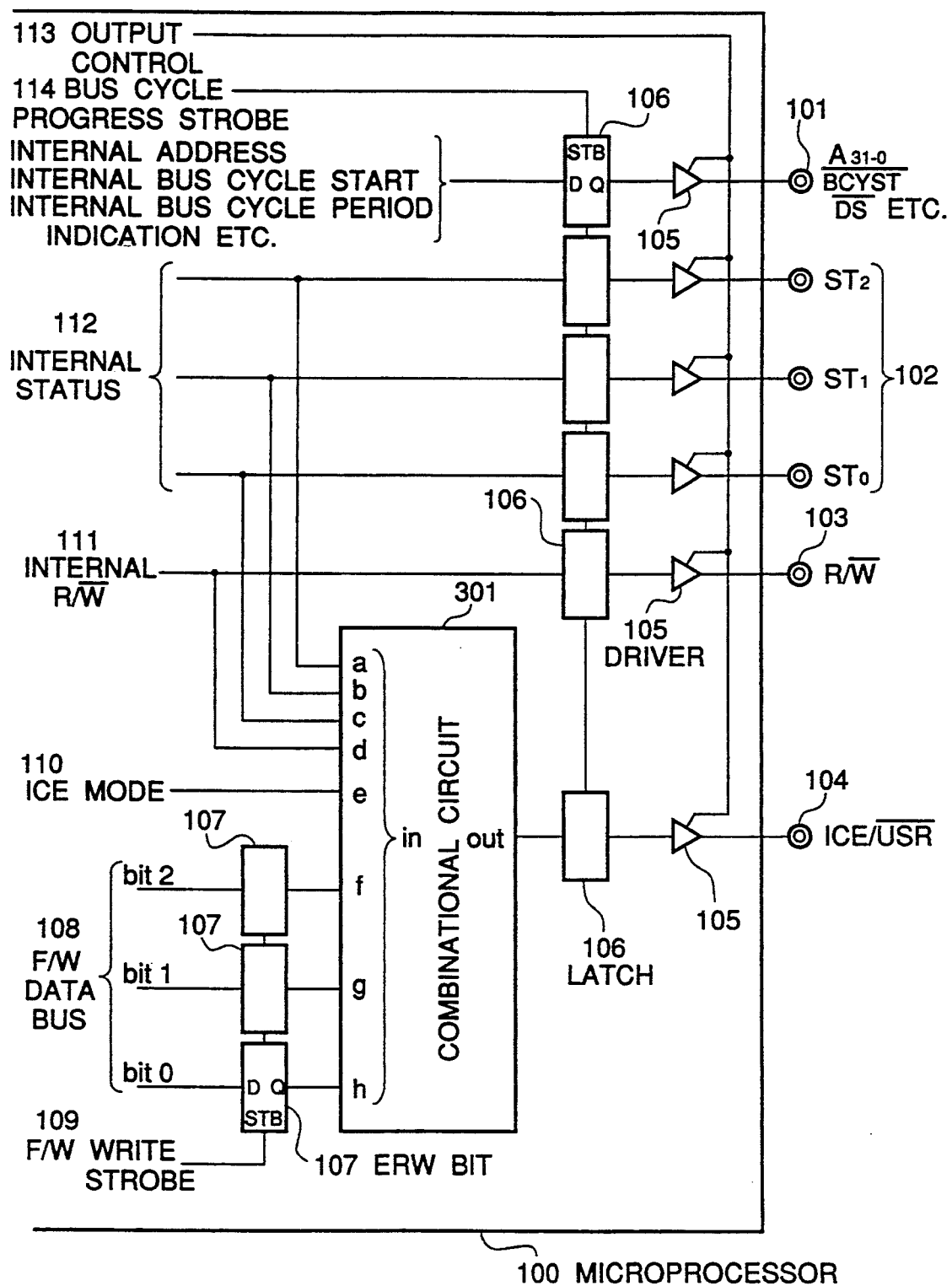
FIG. 1 is a block diagram of an essential part of an embodiment of the microprocessor in accordance with the present invention.

Referring to FIG. 1, there is shown a block diagram of an embodiment of the microprocessor in accordance with the present invention.

The shown microprocessor, generally indicated by Reference Numeral 100, includes a group of output terminals 101 for outputting external address signals $A_{31-0}$ of 32 bits, an external bus cycle start signal $\overline{BCYST}$, an external bus cycle period indication signal $\overline{DS}$ indicating that it is in the period of a bus cycle, and others. The group of output terminals 101 are represented by a single terminal in FIG. 1 for simplification of the drawings. The microprocessor 100 also includes another group of output terminals 102 for outputting external bus cycle status signals $ST_0$ to $ST_2$, an output terminal 103 for outputting an external read/write control signal $R/\overline{W}$, and another terminal 104 for outputting a address space discrimination signal $ICE/\overline{USR}$.

The group of output terminals 101 are connected to outputs of output drivers 105, which have inputs connected to outputs of latches 106, which are in turn coupled to an internal address bus and an internal control bus (both not shown) for receiving internal address signals of 32 bits, an internal bus cycle start signal, an internal bus cycle period indication signal, and others. The output drivers 105 and the output latches 106 for these signals are represented by a single driver and a single latch, respectively, in FIG. 1 for simplification of the drawings.

Similarly, the group of output terminals 102 and the output terminal 103 are connected to outputs of further output drivers 105, which have inputs connected to outputs of corresponding latches 106, which are in turn coupled for receiving internal status signals $ST_0$ to $ST_2$ 112, and an internal read/write control signal 111.

The shown microprocessor also includes three latches 107 coupled to receive "bit 2", "bit 1" and "bit 0" of a firmware data bus 1.08, and controlled by a firmware write strobe signal 109 in such a manner that when the firmware write strobe signal 109 is active, the three bits "bit 2", "bit 1" and "bit 0" of the firmware data bus 108 are latched in the latches 107, respectively. The three bits "bit 2", "bit 1" and "bit 0" of the firmware data bus 108 are called "ERW bits" hereinafter, and the term "firmware" is abbreviated to "F/W" in the specification. Outputs of the ERW bit latches 107 are connected to inputs "f", "g" and "h" of a combinational circuit 301, which also receive, at its input "e", an internal ICE mode signal 110 indicating that the microprocessor 100 itself is put in the ICE mode. Furthermore, the combinational circuit 301 receives, at its inputs "a", "b", "c" and "d", the internal status signals $ST_2$ to $ST_0$ 112, and the internal read/write control signal 111.

An output of the combinational circuit 301 is connected to still another output latch 106, which has an output connected to a corresponding output driver 105 having an output connected to the $ICE/\overline{USR}$ output terminal 104.

All of the output drivers 105 are controlled by an internal output control signal 113, and all of the output latches 106 are controlled by an internal bus cycle progress strobe signal 114, so that all the internal signals supplied to the output latches 106 are latched in the output latches 106 in synchronism to each other.

Here, the three bits latched in the ERW bit latches 107 are set in such a manner that the "bit 2" corresponds to a bus cycle for an instruction fetch; the "bit 1" corresponds to a bus cycle for a reading other than the instruction fetch; and the "bit 0" corresponds to a bus cycle for a writing.

In a period in which the ICE mode signal 110 is active, an activated bus status of the ERW bits 107, the internal status signals 112 and the internal read/write signal 111 are compared and discriminated in the combinational circuit 301, and if a predetermined condition holds, the combinational circuit 301 outputs an $ICE/\overline{USR}$ signal 104 of "1".

Figure 2:
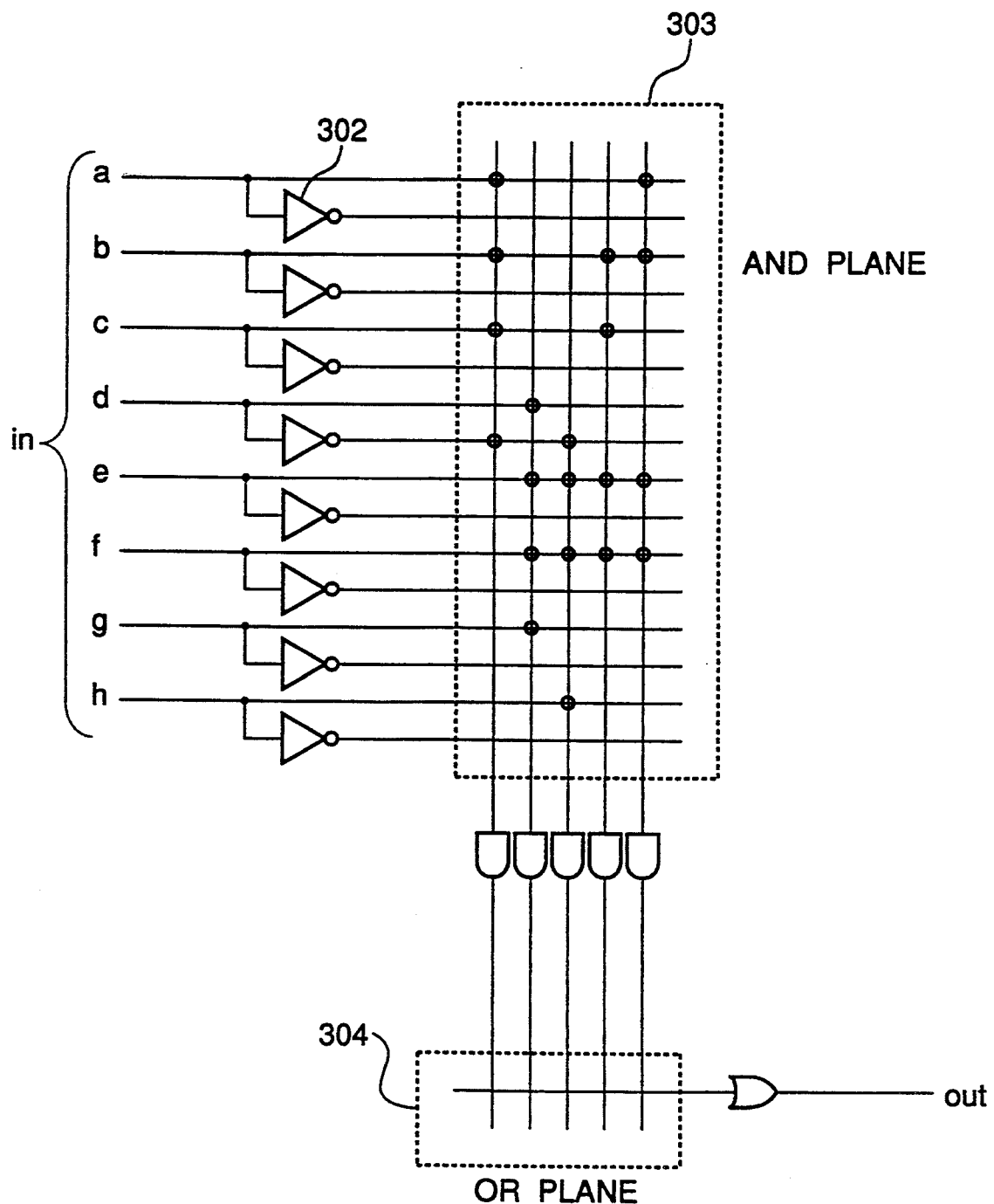
FIG. 2 is a logic circuit diagram of the combinational circuit used in the microprocessor shown in FIG. 1.

This combinational circuit 301 can be realized by a programmable logic array as shown in FIG. 2, which includes an array of input inverters 302, an AND plane 303 programmed as shown, an OR plane 304.

Figure 3:
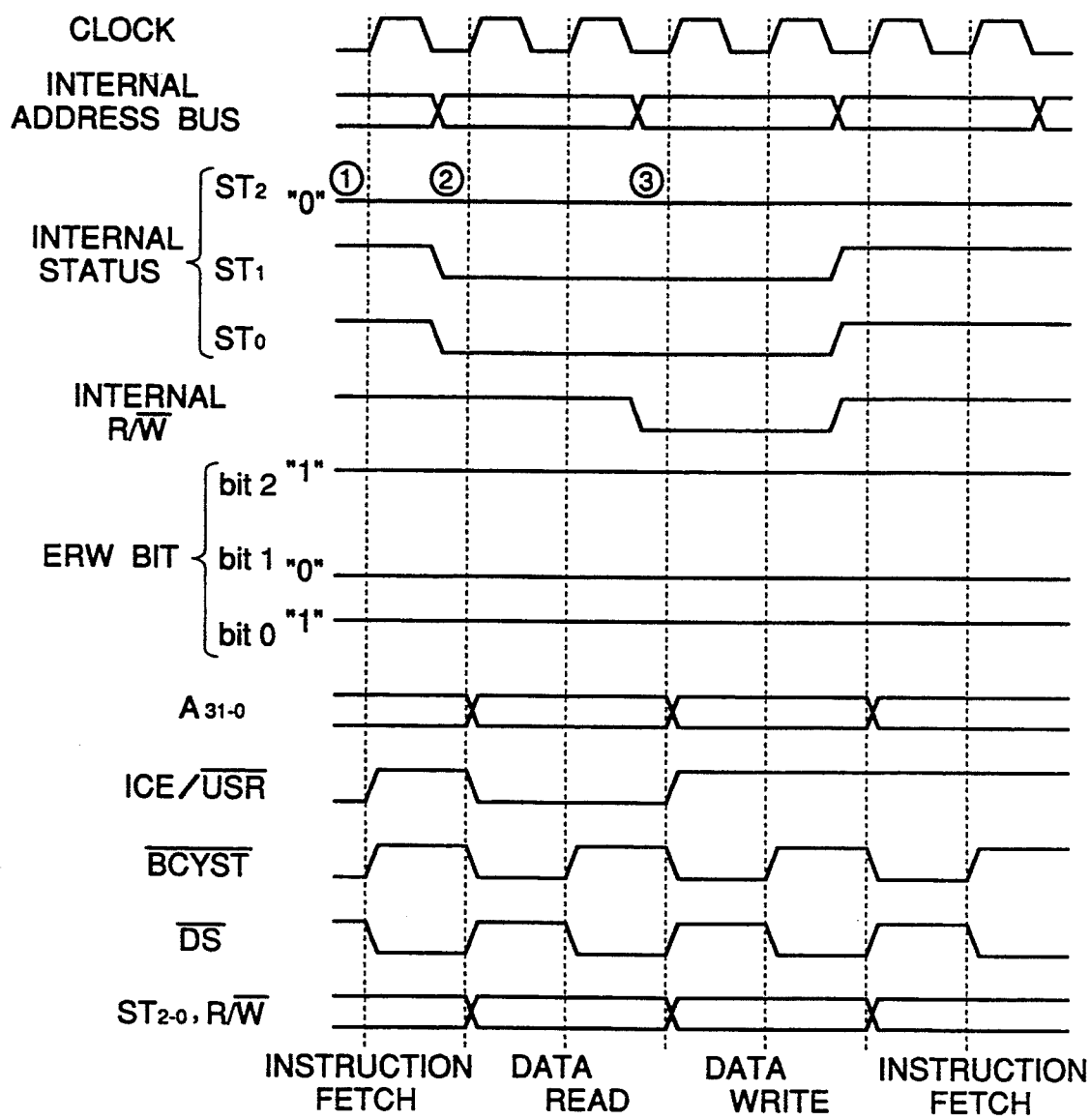
FIG. 3 is a timing chart illustrating an operation of the microprocessor shown in FIG. 1.

Now, operation of the shown microprocessor will be described with reference to the timing chart of FIG. 3 illustrating an operation of the microprocessor shown in FIG. 1, and the table of FIG. 4 showing examples of status codes.

In a status in which the "bit 2" and the "bit 0" of the ERW bits 107 are set to "1" and the "bit 1" of the ERW bits 107 is set to "0"; namely, when it is set that the instruction fetch bus cycle and the write bus bus cycle are the ICE address space access and the read bus cycle other than the instruction fetch is the user address space access, the combinational circuit 301 generates the output signal of "1" in response to the internal status signal 112 of (0, 1, 1) and the read/write signal 111 of "1" as shown at a timing ① in FIG. 3. Therefore, the $ICE/\overline{USR}$ signal 104 is brought into "1" in synchronism with a rising of a clock just after the output signal of the combinational circuit 301 is brought to "1". The $ICE/\overline{USR}$ signal 104 of "1" indicates that the bus cycle is the ICE address space access.

Similarly, the combinational circuit 301 generates the output signal of "0" in response to the internal status signal 112 of (0, 0, 0) and the mad/write signal 111 of "1" as shown at a timing ② in FIG. 3, so that the ICE/$\overline{\text{USR}}$ signal 104 is brought into "0" in synchronism with a rising of a clock just after the timing ②. In addition, the combinational circuit 301 generates the output signal of "1" in response to the internal status signal 112 of (0, 0, 0) and the read/write signal 111 of "0" as shown at a timing ③ in FIG. 3, so that the ICE/$\overline{\text{USR}}$ signal 104 is brought into "1" in synchronism with a rising of a clock just after the timing ③.

Figure 5:
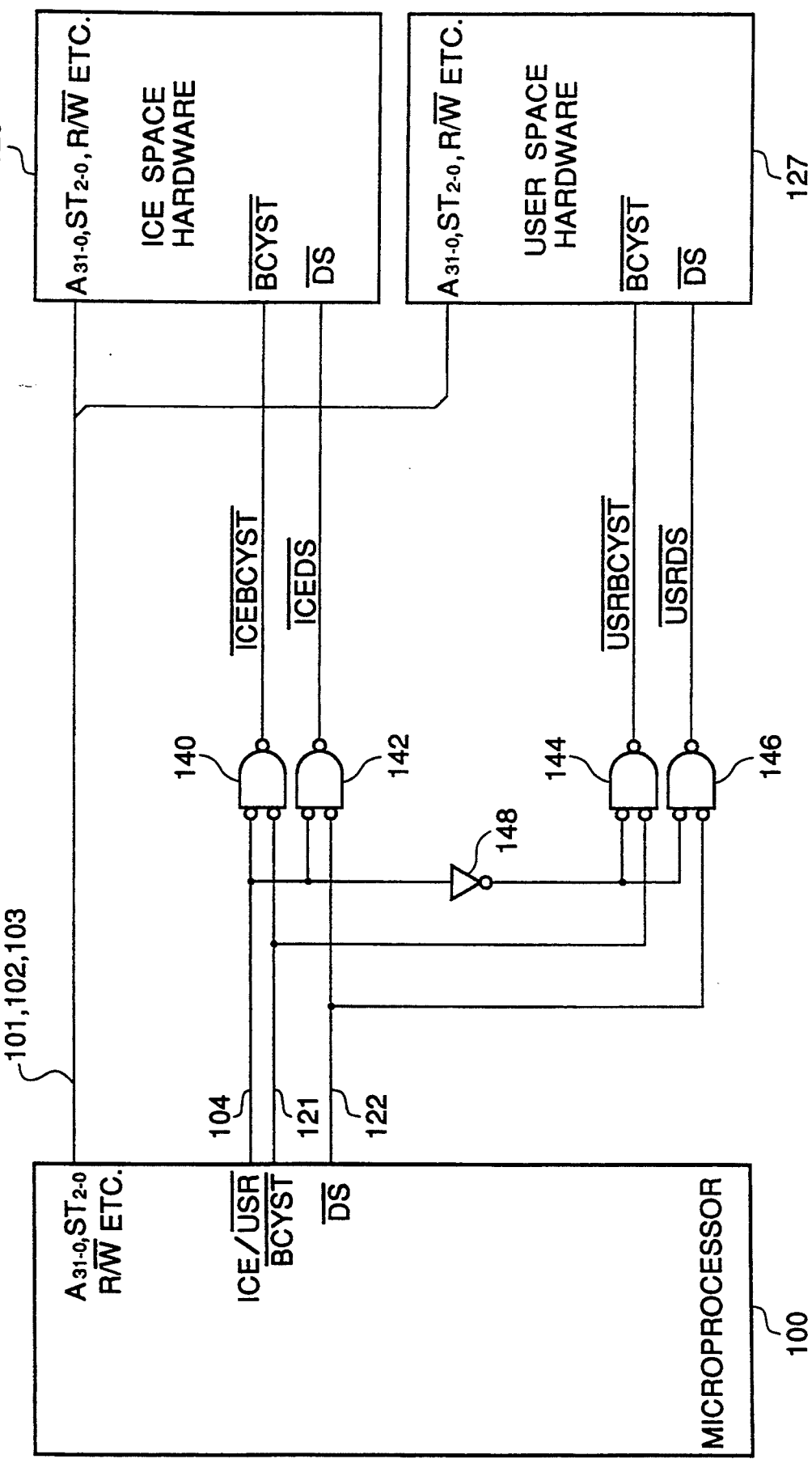
FIG. 5 is a block diagram of an ICE system using the microprocessor in accordance with the present invention.

Referring to FIG. 5, there is shown an example of an ICE system incorporating therein the shown microprocessor.

The external address signals $A_{31-0}$ of 32 bits, the external bus cycle status signals $ST_0$ to $ST_2$, and the external read/write control signal $R/\overline{W}$, which are outputted from the microprocessor 100, are supplied to an ICE space hardware 126 and a user address space hardware 127. On the other hand, the external bus cycle start signal $\overline{\text{BCYST}}$ 121 and the external bus cycle period indication signal $\overline{\text{DS}}$ 122 are respectively supplied through a first pair of AND gates 140 and 142 to the ICE address space hardware 126. The external bus cycle start signal $\overline{\text{BCYST}}$ 121 and the external bus cycle period indication signal $\overline{\text{DS}}$ 122 are also respectively supplied through a second pair of AND gates 144 and 146 to the user address space hardware 127.

The first pair of AND gates 140 and 142 is controlled by the ICE/$\overline{\text{USR}}$ signal 104 so that when the ICE/$\overline{\text{USR}}$ signal is of "1" indicating that the access is the ICE address space access, the external bus cycle start signal $\overline{\text{BCYST}}$ 121 and the external bus cycle period indication signal $\overline{\text{DS}}$ 122 are respectively supplied through the first pair of AND gates 140 and 142 to the ICE address space hardware 126 as an ICE bus cycle start signal $\overline{\text{ICEBCYST}}$ and an ICE bus cycle period indication signal $\overline{\text{ICEDS}}$. The second pair of AND gates 144 and 146 is controlled through an inverter 148 by the ICE/$\overline{\text{USR}}$ signal 104 so that if the ICE/$\overline{\text{USR}}$ signal is of "0" indicating that the access is the user address space access, the external bus cycle start signal $\overline{\text{BCYST}}$ 121 and the external bus cycle period indication signal $\overline{\text{DS}}$ 122 are also respectively supplied through the second pair of AND gates 144 and 146 to the user address space hardware 127 as a user bus cycle start signal $\overline{\text{USRBCYST}}$ and a user bus cycle period indication signal $\overline{\text{USRDS}}$. Thus, the external bus cycle start signal $\overline{\text{BCYST}}$ and the external bus cycle period indication signal $\overline{\text{DS}}$ are alternatively supplied to either the ICE address space hardware 126 or the user address space hardware 127.

Figure 6:
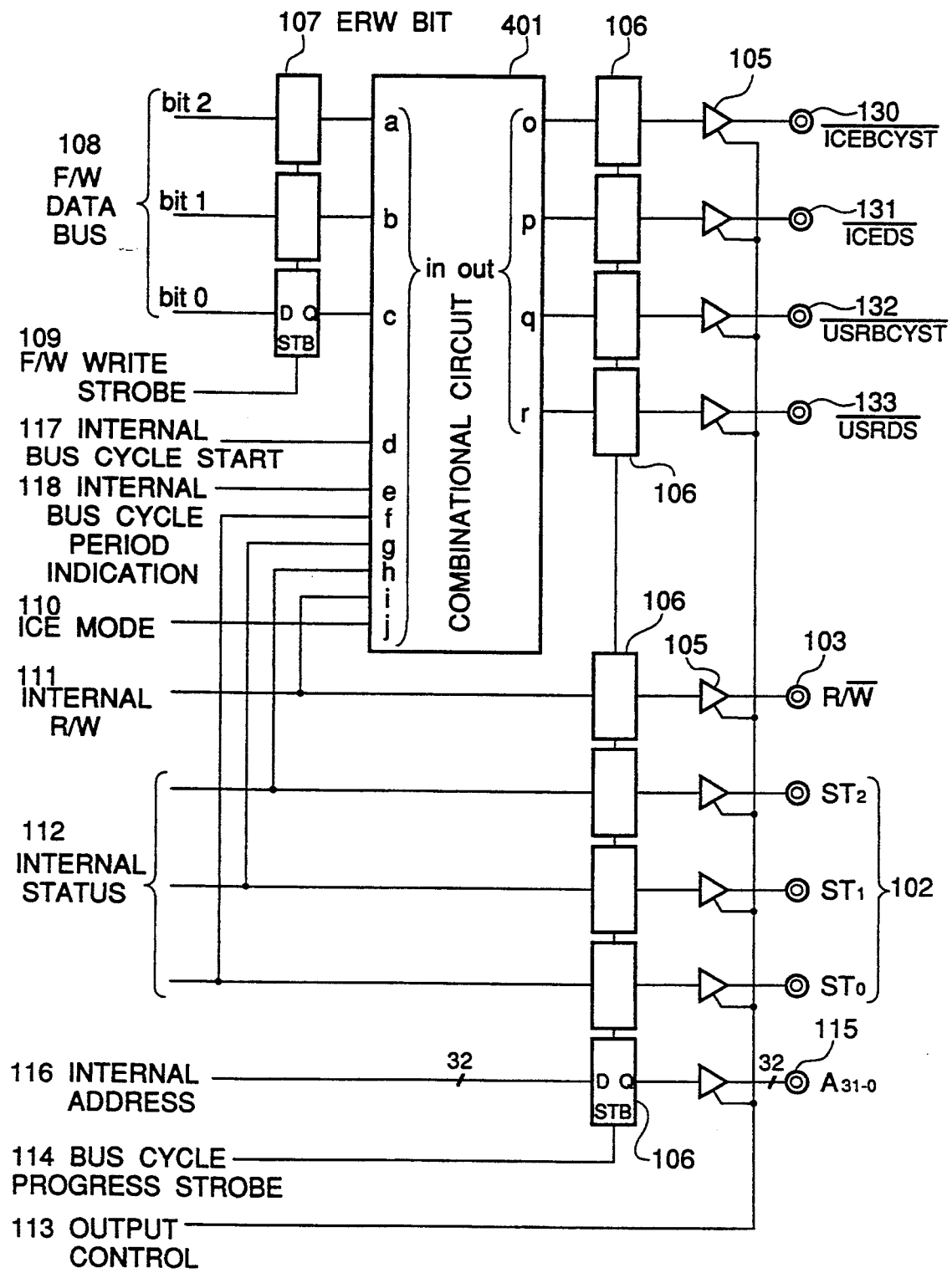
FIG. 6 is a block diagram of an essential part of another embodiment of the microprocessor in accordance with the present invention.

Turning to FIG. 6, there is shown a block diagram of an essential part of another embodiment of the microprocessor in accordance with the present invention. In FIG. 6, elements corresponding to those shown in FIG. 1 are given the same Reference Numerals, and explanation thereof will be omitted.

As seen from comparison between FIG. 1 and 6, no external ICE/$\overline{\text{USR}}$ terminal 104 is provided in the second embodiment, and external terminals 115 for only the address $A_{31-0}$ are provided. In addition, the second embodiment of the microprocessor has an output terminal 130 for the ICE bus cycle start signal $\overline{\text{ICEBCYST}}$, an output terminal 131 for the ICE bus cycle period indication signal $\overline{\text{ICEDS}}$, an output terminal 132 for the user bus cycle start signal $\overline{\text{USRBCYST}}$ and an output terminal 133 for the user bus cycle period indication signal $\overline{\text{USRDS}}$.

The ICE bus cycle start signal $\overline{\text{ICEBCYST}}$ 130, the ICE bus cycle period indication signal $\overline{\text{ICEDS}}$ 131, the user bus cycle start signal $\overline{\text{USRBCYST}}$ 132, and the user bus cycle period indication signal $\overline{\text{USRDS}}$ 133 are generated by a combinational circuit 401, which receives the three ERW bits 107, the F/W write strobe signal 109, the internal read/write control signal 111, the internal status signals 112, the internal bus cycle start signal 117 and the internal bus cycle period indication signal 118.

Figure 7:
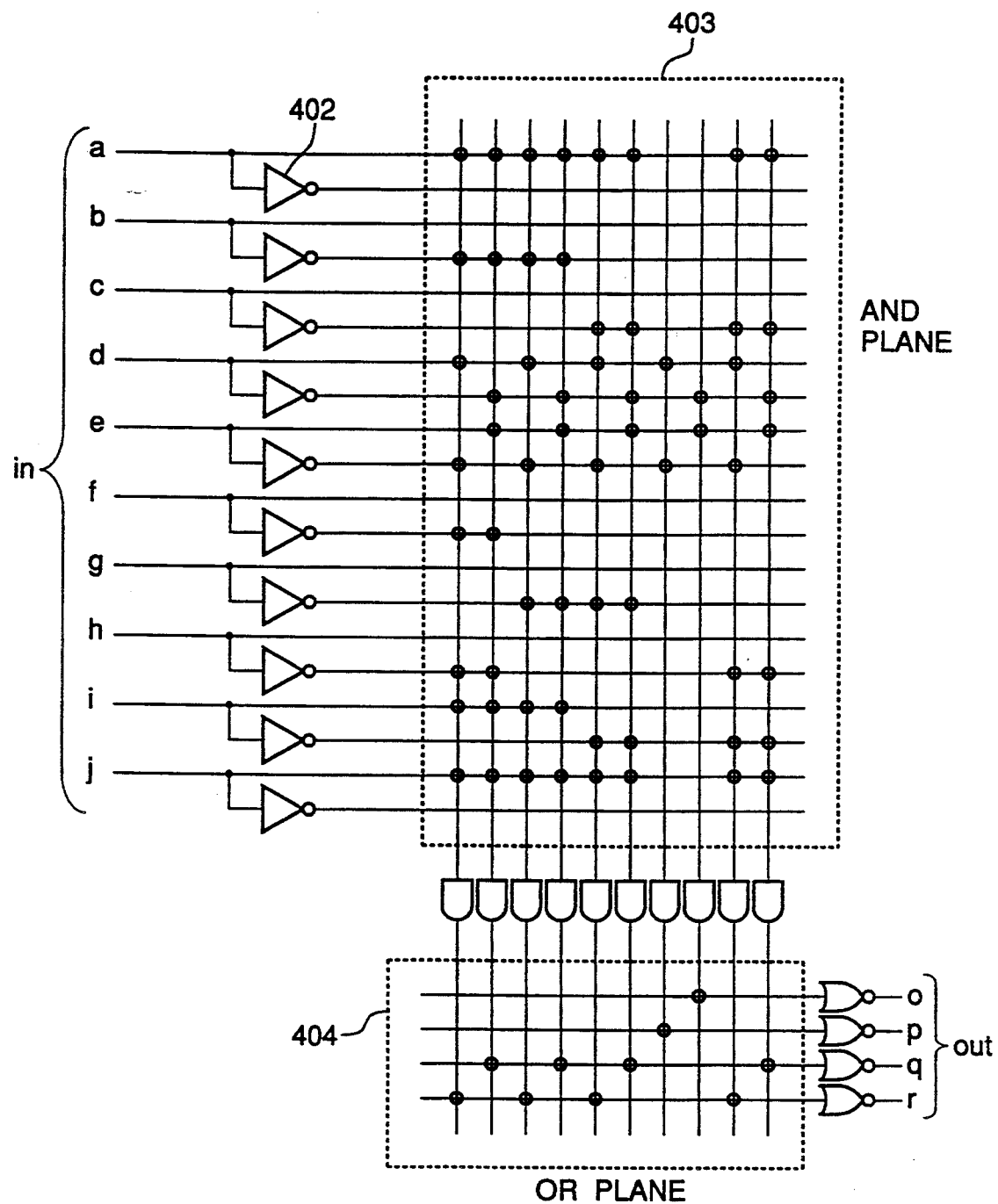
FIG. 7 is a logic circuit diagram of the combinational circuit used in the microprocessor shown in FIG. 6.

For example, the combinational circuit 401 can be realized by a programmable logic array as shown in FIG. 7, which includes an array of input inverters 402, an AND plane 403 programmed as shown, and an OR plane 404.

From comparison between FIGS. 5 and 6, it can be said that the embodiment shown in FIG. 6 corresponds to a combination of the microprocessor 100 and the logic gates 140 to 148 shown in FIG. 5.

Figure 8:
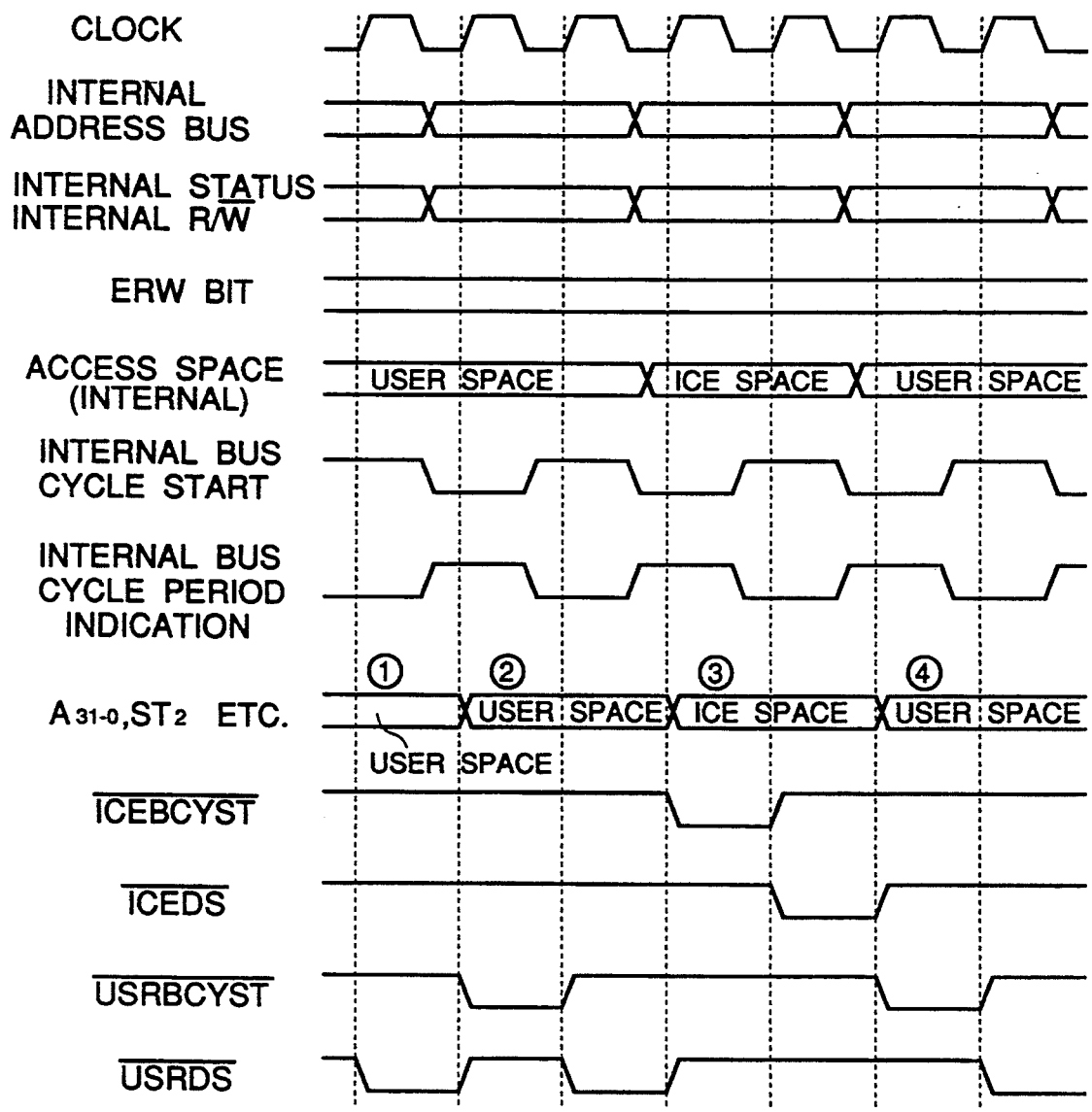
FIG. 8 is a timing chart illustrating an operation of the microprocessor shown in FIG. 6.

Referring to FIG. 8, there is shown a timing chart illustrating an operation of the microprocessor shown in FIG. 6. As seen from FIG. 8, accesses at timings ①, ② and ④ are the user space access, and the user bus cycle start signal $\overline{\text{USRBCYST}}$ 132 and the user bus cycle period indication signal $\overline{\text{USRDS}}$ 133 are activated. An access at a timing ③ is the ICE space access, and the ICE bus cycle start signal $\overline{\text{ICEBCYST}}$ 130 and the ICE bus cycle period indication signal $\overline{\text{ICEDS}}$ 131 are activated. Operation other than the above mentioned points are the same as that of the first embodiment.

In the above mentioned embodiments, the ERW bits 1.07 are set by the firmware. However, it would be apparent in persons skilled in the art that the ERW bits 107 can be set by software or hardware.

As seen from the description of the embodiments with reference to the drawings, the microprocessor in accordance with the present invention is characterized in that the discrimination between the use address space access and the ICE address space access is executed on the basis of the previously set condition and the bus cycle attribute of the read cycle, the write cycle and the instruction fetch cycle. This function of the discrimination between the user address space access and the ICE address space access is realized in the internal circuit of the microprocessor. Therefore, the re-mapping processing in the ICE monitor program becomes unnecessary, and it is possible to avoid the increase of the delay in various control signals. In addition, all space provided to users as architecture of a microprocessor can be ensured in both of the user space and the ICE space.

The invention has thus been shown and described with reference to the specific embodiments. However, it should be noted that the present invention is in no way limited to the details of the illustrated structures but changes and modifications may be made within the scope of the appended claims.

I claim:

1. A microprocessor for use in an in-circuit emulator comprising:
    a first latch storing a bit indicating a first bus cycle mode of a read cycle, a second latch storing a bit indicating a second bus cycle mode of a write cycle, and a third latch storing a bit indicating a third bus cycle of an instruction fetch cycle, said first, second and third latches being responsive to a first strobe signal to temporarily store the bits corresponding to said read cycle, said write cycle and said instruction fetch cycle, respectively;
    a combinational logic circuit connected to receive a code set in said first, second and third latches in response to said first strobe signal and further connected to receive coded information, including an internal read/write signal, a plurality of internal status signals and an in-circuit emulator mode signal, indicating the kind of bus cycle mode, the combinational logic circuit logically combining the code set in said first, second and third latches, the internal read/write signal, the plurality of internal status signals and the in-circuit emulator mode signal to generate an output indicative of an access to a user address space or in-circuit emulator address space;

fourth and fifth latches respectively connected to receive two types of bus cycle indication signals which are alternatively rendered active, said fourth and fifth latches being responsive to an internal bus cycle progress strobe signal so that said two types of bus cycle indication signals are latched in synchronism to each other in said fourth and fifth latches;

a sixth latch connected to receive an output of said combinational logic circuit so as to output, in response to said internal bus cycle progress strobe signal, said output of said combinational circuit in synchronism with a start of a corresponding bus cycle; and an output circuit connected to said fourth, fifth and sixth latches and responsive to an output control signal to selectively supply an external bus cycle start signal and an external bus cycle period indication signal to either user memory address space or in-circuit emulator address space, depending on a logical value of the output of said combinational logic circuit.

2. A microprocessor claimed in claim 1 further including a latch means for latching an internal address and the internal read/write signal and the plurality of internal status signals, said latch means being controlled by said internal bus cycle progress strobe of the microprocessor, so that said output of said combinational circuit and said internal address, the internal read/write and the plurality of internal status signals are latched in the same timing, and an external circuit connected to said latch means for supplying the internal address, the internal read/write signal and the plurality of internal status signals to said in-circuit emulator address space and said user address space.

3. A microprocessor claimed in claim 1 wherein said combinational logic circuit comprises an AND logic plane and an OR logic plane, said OR logic plane generating a single output indicative of an access to a user address space or in-circuit emulator address space, said output circuit comprising first and second pairs of external AND gates, said first pair of AND gates being directly connected to receive the single output of said combinational logic circuit and said second pair of AND gates being connected via an inverter to receive the single output of said combinational logic circuit, respective ones of said pairs of AND gates receiving said external bus cycle start signal and said external bus cycle period indication signal, said first pair of AND gates having outputs connected to user memory address space and said second pair of AND gates having outputs connected to in-circuit emulator address space.

4. A microprocessor for use in an in-circuit emulator comprising:

a first latch storing a bit indicating a first bus cycle mode of a read cycle, a second latch storing a bit indicating a second bus cycle mode of a write cycle, and a third latch storing a bit indicating a third bus cycle of an instruction fetch cycle, said first, second and third latches being responsive to a first strobe signal to temporarily store the bits corresponding to said read cycle, said write cycle and said instruction fetch cycle, respectively;

a combinational logic circuit connected to receive a code set in said first, second and third latches in response to said first strobe signal and further connected to receive coded information, including an internal read/write signal, a plurality of internal status signals, two types of bus cycle indication signals which are alternatively rendered active, and an in-circuit emulator mode signal, indicating the kind of bus cycle mode, the combinational logic circuit logically combining the code set in said first, second and third latches, the internal read/write signal, the plurality of internal status signals and the in-circuit emulator mode signal to generate an output indicative of an access to a user address space or in-circuit emulator address space;

fourth, fifth, sixth, and seventh latches connected to receive outputs of said combinational logic circuit so as to output, in response to an internal bus cycle progress strobe signal, said output of said combinational circuit in synchronism with a start of a corresponding bus cycle; and an output circuit connected to said fourth, fifth, sixth, and seventh latches and responsive to an output control signal to selectively supply an external bus cycle start signal and an external bus cycle period indication signal to either user memory address space or in-circuit emulator address space, depending on a logical value of the output of said combinational logic circuit.

5. A microprocessor claimed in claim 4 wherein said combinational logic circuit comprises an AND logic plane and an OR logic plane, said OR logic plane generating first and second pairs of outputs, said first pair of outputs being connected to supply said external bus cycle start signal and said external bus cycle period indication signal to user memory address space and said second pair of outputs being connected to supply said external bus cycle start signal and said external bus cycle period indication signal to in-circuit emulator address space.

6. A microprocessor claimed in claim 5 further including a latch means for latching an internal address and the internal read/write signal and the plurality of internal status signals, said latch means being controlled by said internal bus cycle progress strobe of the microprocessor, so that said output of said combinational circuit and said internal address, the internal read/write and the plurality of internal status signals are latched in the same timing, and an external circuit connected to said latch means for supplying the internal address, the internal read/write signal and the plurality of internal status signals to said in-circuit emulator address space and said user address space.

7. A microprocessor for performing a bus cycle to access one of a first address space and a second address space, comprising:

bus cycle means for initiating said bus cycle with generating status information, said status information taking one of a first state indicating that said bus cycle is for an instruction fetch cycle, a second state indicating that said bus cycle is for a data read cycle and a third state indicating that said bus cycle is for a data read cycle;

a register having first, second and third bits provided correspondingly to said first, second and third states of said status information, each of said first, second and third bits being programmable to be one of a first logic state and a second logic state;

a combination circuit coupled to said bus cycle means and said register to receive said status information and the logic states of said first, second and third bits and generating access space discrimination information in response thereto, said access space discrimination information assuming a first condition indicative of said first address space being accessed when said status information takes said first state and said first bit is in said first logic state and a second condition indicative of said second address space being accessed when said status information takes said first state and said first bit is in said second logic state or when said status information takes said second state and said second bit is in said second logic state or when said status information takes said third state and said third bit is in said second logic state; and means for outputting said access space discrimination information in synchronism with said bus cycle.

8. The microprocessor as recited in claim 7 wherein said microprocessor is for an in-circuit emulator, the first address space is an in-circuit emulator address space, and the second address space is a user's address space.

* * * * *